Figure 1:
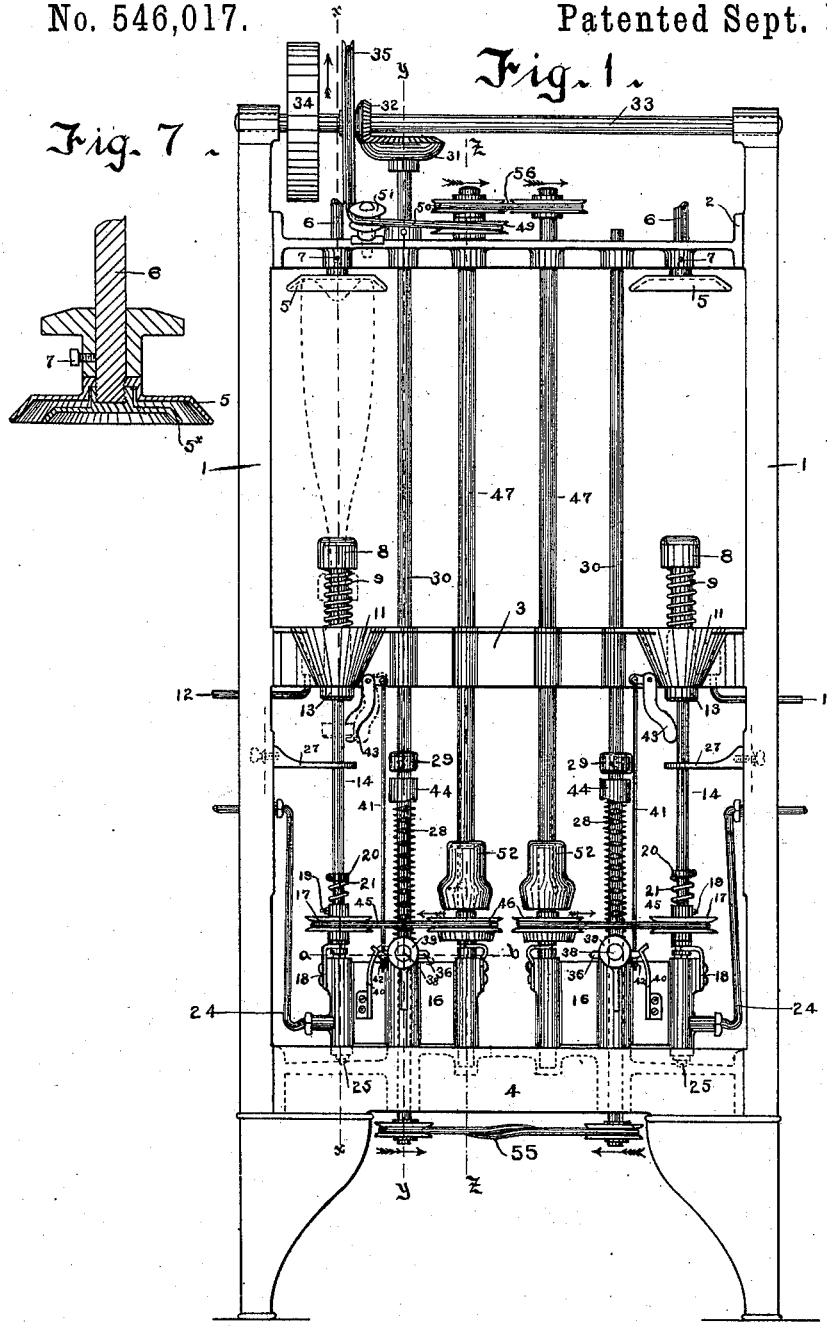

(No Model.) 3 Sheets—Sheet 2.
H. LA CASSE.
BOTTLE WASHER.
No. 546,017. Patented Sept. 10, 1895.
Fig. 2.
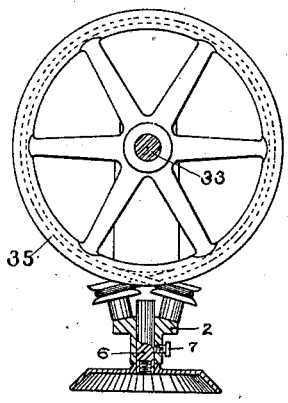
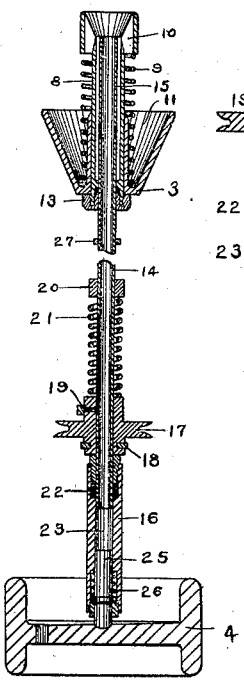
Fig. 2ª
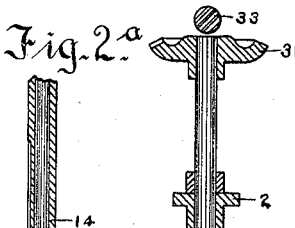
Fig. 3.
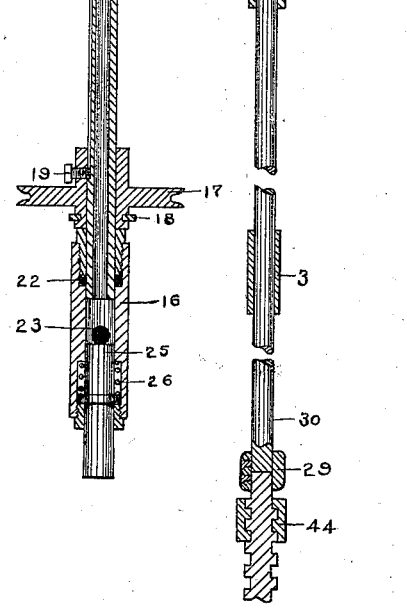
Fig. 4.
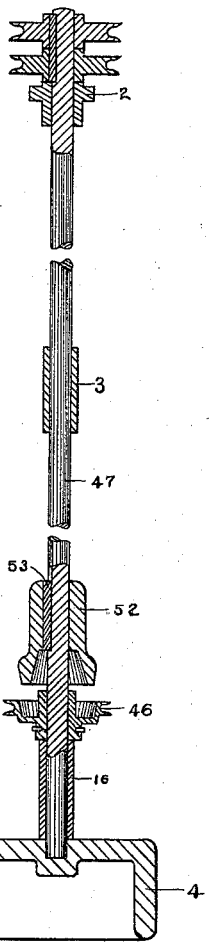
Witnesses.
Thomas Durant
Wallace Murdock
Inventor.
Henry LaCasse
by Church & Church
his atty's.

(No Model.)  3 Sheets—Sheet 3.
H. LA CASSE.
BOTTLE WASHER.
No. 546,017.  Patented Sept. 10, 1895.
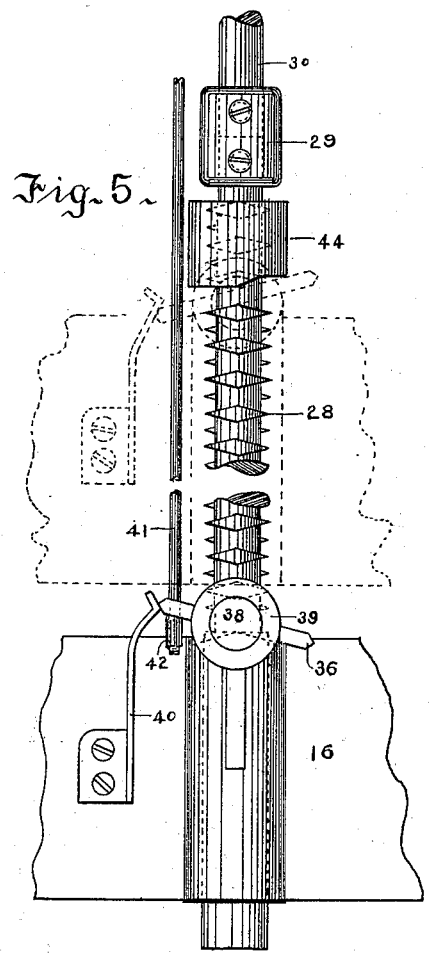
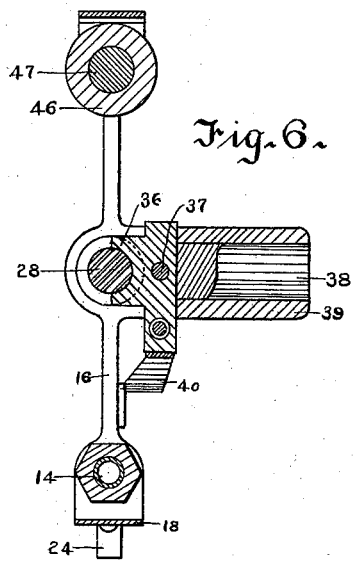
Witnesses.  Inventor.

UNITED STATES PATENT OFFICE.

HENRY LA CASSE, OF ROCHESTER, NEW YORK.

BOTTLE-WASHER.

SPECIFICATION forming part of Letters Patent No. 546,017, dated September 10, 1895.

Application filed October 23, 1894. Serial No. 526,716. (No model.)

*To all whom it may concern:*

Be it known that I, HENRY LA CASSE, of Rochester, in the county of Monroe and State of New York, have invented certain new and useful Improvements in Bottle-Washing Machines; and I do hereby declare the following to be a full, clear, and exact description of the same, reference being had to the accompanying drawings, forming a part of this specification, and to the reference-numerals marked thereon.

My present invention relates to bottle-washing machines of the class shown in my prior Letters Patent, No. 518,322, dated April 17, 1894, and has for its object to provide one that is automatic in its operation, though some of the parts may be readily adapted to other machines which are not automatic in their action; and to these and other ends the invention consists in certain improvements in construction and combinations of parts, all as will be hereinafter fully described, and the novel features pointed out in the claims at the end of this specification.

In the drawings, Figure 1 is a front elevation of a machine constructed in accordance with my invention adapted for operating on two bottles at once; Fig. 2, a longitudinal sectional view of the brush-spindle taken on the line $x\ x$ of Fig. 1; Fig. $2^a$, a detail sectional view of the lower part of the wash-spindle when raised with the valve open; Fig. 3, a sectional view on the line $y\ y$ of Fig. 1 of the threaded spindle and its attachments; Fig. 4, a similar view on the line $z\ z$ of Fig. 1 of one of the driving-spindles and its clutch; Fig. 5, an enlarged front elevation of the reversing devices; Fig. 6, a horizontal sectional view on the line $a\ b$ of Fig. 1, showing the clutch and support; Fig. 7, a sectional view of a modified form of holder for the bottom of the bottle.

Similar reference-numerals in the several figures indicate similar parts.

The main frame of the machine is composed of two upright side pieces 1 1, connected near the top by a cross-piece 2, and below this an intermediate cross-piece 3, and at the bottom a casting or cross-piece 4. In the present embodiment of my invention I have shown two washing devices mounted upon a single frame; but it is obvious that any number could be employed, if desired, and a description of one of these devices will suffice for both. The bottle to be washed is, as usual, supported bottom upward in the main frame and the brush, preferably composed of a split rubber tube fastened to the end of the rotary longitudinally-movable hollow shaft, is moved in and out of the mouth of the bottle by the driving mechanism. In the present instance the upper end of the bottle rests against the cup-shaped holder 5, attached to the stem 6, passing through the upper cross-piece 2 of the frame and held in position by a set-screw 7 or similar device, by means of which the holder may be adjusted vertically for different-sized bottles. The lower end of the bottle is engaged by a vertically-movable sleeve 8, passing through the cross-piece 3 of the frame and normally pressed upward by a spring 9, which serves to clamp the bottle in position. The head on the end of this sleeve is provided with suitable apertures or recesses 10 for the passage of water from the bottle. The said sleeve is adapted to operate through the cross-piece 3 of the frame, which is also provided with a water-receptacle 11, with which connects a pipe 12, leading to the sewer or elsewhere. The sleeve 8 is provided with a nut or collar 13 below the receptacle 11, which not only serves to prevent the upward movement, but also as an abutment, by the movement of which the spindle-driving mechanism is set in operation.

14 indicates the hollow spindle, carrying at its upper end a brush 15, normally contained within the sleeve 8, while its lower end is supported in a movable frame or carriage 16, in which latter it is permitted a slight longitudinal movement, as will be described.

17 is a belt-pulley secured to the frame 16 by a yoke-bracket 18, operating in a groove therein, which pulley is connected to the spindle 14 by means of a screw 19, passing through its side and entering a groove or keyway in the side of the spindle, said groove being sufficiently long to permit a slight independent longitudinal movement of the spindle relative to the pulley, as shown in Fig. $2^a$.

20 indicates a collar attached to the spindle, between which and the top of the pulley 17 is arranged a spring 21 moving the spindle vertically and holding the lower end of the keyway against the screw 19. A suitable stuffing-box 22 is provided in the carriage 16, where the spindle enters it, and the said carrige is further provided with an interior chamber 23 with which connects a flexible water-pipe 24, the entrance to said chamber being controlled by a plug-valve 25 normally opened by a spring 26 and held closed against said spring when the carriage is in its lowermost position by the valve engaging the lower cross-piece 4 of the main frame. When the carriage is moved vertically to carry the brush up into the bottle, the water is automatically admitted by means of the valve 25, and the collar 20 on said spindle is adapted to be engaged by a stop 27, secured to the main frame, arresting the upward movement of the spindle before the carriage reaches its highest point and begins its downward movement, thereby permitting the brush to operate for a longer time on the bottom of the bottle in substantially the same way as described in my patent before referred to. The bracket 27 may be adjusted on the frame by means of the thumb-screw, as shown, or otherwise, to cause the proper operation of the parts. The means employed to cause the reciprocations of the carriage carrying the brush spindle is, in the present instance, a double screw or shaft having reversed threads cut therein, in which operates a reversible switch supported upon the carriage. In the present construction this double screw is indicated by 28, and is journaled in the lower cross-piece 4 of the frame and connected by a coupling 29 with a shaft 30, extending through the cross-pieces 2 and 3 and forming in effect a continuation of the screw, the upper end of said shaft having secured to it a beveled gear 31, meshing with a corresponding pinion 32 on the main driving-shaft 33, which latter is also provided with a belt-pulley 34 and a smaller belt-wheel 35. The switch on the carriage 16 for engaging the thread of the screw consists of a plate 36, curved to partially embrace the screw-shaft and connected by a screw or pin 37 with a pintle 38, mounted in a boss 39 on the carriage 16 and permitted an oscillating motion therein. One or both ends of the plate 36 are extended and are brought to an edge, as shown in Figs. 1 and 5, and with said end is arranged to co-operate a spring 40, having a bearing-point, as shown, projecting toward the center of oscillation of the stud 38, so as to hold the said switch in the positions shown in full and dotted lines in Fig. 5, when it is moved to engage with one or the other of the threads on the screw.

When the machine is at rest, the concave end of the switch 36 operates in the circular groove at the end of the screw; but when it is turned to either of the positions shown in Fig. 5, it will engage one or the other of the threads and cause the carriage to move up or down, the screw rotating in the same direction. The means for operating said switch to cause the upward movement of the carriage consists of a vertically-movable rod 41, passing through the switch and having an adjustable boss or projection 42 at its lower end below the switch and connected at its upper end with a short arm of a bell-crank lever 43, pivoted on the cross-piece 3 of the main frame and having its other end extending in position to be engaged by the nut on the lower end of the sleeve 8, when the latter is moved downward to insert a botttle into the machine. The reverse movement of the switch is caused by the collar 44, fastened on the screw-shaft and having its lower side inclined in such a direction that when the switch engages it, it will be turned to co-operate with the thread by which the carriage will be forced downward, as shown in dotted lines in Fig. 5, the spring 40 holding the switch in this position until the carriage reaches its lowermost position, when the switch passing into the concentric groove in the threaded shaft will turn to the position shown in Fig. 1 and the carriage will remain stationary.

The belt-wheel 17 on the hollow spindle is driven by a belt 45 from a belt-wheel 46, loosely mounted on a shaft 47 and connected by a yoke-bracket 48 with the carriage, said shaft 47 being arranged in stationary bearings in the main frame and provided at its upper end with a belt-pulley 49, from which the belt 50 passes to the pulley 35 on the main driving-shaft around suitable guide-pulleys 51. The pulley 46 is provided in its upper side with a tapering recess and forms a clutch-section, with which co-operates a corresponding vertically-movable weighted clutch-section 52 on the shaft 47, having a key 53, which co-operates with a groove or keyway in said shaft, the lower end of said spline or key engaging the end of the keyway and constituting a stop, so that the downward movement of the section 52 is limited, and the clutch is automatically disengaged when the carriage reaches its lowermost position; but as soon as the carriage moves upward the clutch-sections will become engaged and the spindle carrying the brush rotated through the means just described.

The machine shown in the accompanying drawings is made double—that is to say, to operate on two bottles at once—but the parts are precisely the same, and I have shown the two screw-shafts connected by a belt 55, passing around suitable pulleys, while the upper ends of the clutch-shafts 47 are connected by a belt 56, passing around suitable pulleys on their upper ends; but other means for connecting the two sets of devices may be employed, if desired.

The operation will now be understood. The carriage being in the lowermost position, as shown in Fig. 1, the water-supply is cut off, the spindle carrying the brush is stationary, and the operator inserting the mouth of a bottle in the sleeve 8 and pressing down the latter allows the bottom to go up into the holder 5. This downward movement of the sleeve drawing the rod 41 upward through the bell-crank turns the switch to the position shown in full lines in Fig. 5, the screw causing the carriage to travel upward, the water being automatically turned on, and the brush passing up into the bottle in the usual manner. As soon as the carriage starts upward the clutch-sections 46 and 52 are engaged and the spindle carrying the brush is rotated, causing the ends of the brush to fly out and engage the sides of the bottle, as usual. Just before the switch reaches the reversing-collar 44 on the screw, the collar 20 on the spindle engages the projection 27, holding the spindle from vertical movement and causing the brush to operate for a short space of time on the bottom of the bottle until the switch reaches said collar 44, when it will be reversed and held by the spring 40 and the carriage moved downward by the screw.

When it is desired to operate upon small—say pint—bottles, it is only necessary to secure within the holding-bracket 5 a smaller bracket $5^x$, as shown in Fig. 7, which may be screwed upon or into the end of the spindle 6, and the latter adjusted vertically to bring said bracket into proper relation to the spring-operated sleeve.

When inserting the bottle in the machine, the sleeve 8 will, of course, have to be moved lower than the position it normally occupies when holding the bottle, and it is this movement that starts the machine in operation.

By the employment of this machine it is only necessary to insert the bottles in proper position, when the machine is started, the operation completed, and the bottles drained, and the machine brought to rest again, so that the attendant can remove the clean bottle and insert a dirty one, and, furthermore, the bottle is held in such position that it can be viewed or inspected all the time, and, if necessary, can be washed a second time by simply operating the bell-crank lever, as before described.

I claim as my invention—

1. In a bottle-washing machine, the combination with the main frame, and a bottle-support, of a spindle having a brush thereon, a carriage on which said spindle is mounted, a reversely threaded screw, a switch on the carriage engaging the screw, and a spring on the carriage for holding it, substantially as described.

2. In a bottle-washing machine, the combination with the main frame, and a bottle-support, of a brush carrying spindle, a carriage on which it is mounted, a reversely threaded screw having the concentric groove at one end and the reversing projection at the other, a switch on the carriage engaging the screw, and a spring for holding it in engagement with either of the threads, substantially as described.

3. In a bottle-washing machine, the combination with the main frame, and a bottle-support, of a brush carrying spindle, a carriage on which it is mounted, a reversely threaded screw having the concentric groove at one end, a switch on the carriage engaging the screw, a spring for holding it in engagement with either of the threads, and a handle controlled by the operator for engaging the switch with one of the threads, substantially as described.

4. In a bottle-washing machine, the combination with the main frame, and bottle-holding devices embodying a movable part, of a brush carrying spindle, a carriage on which it is mounted, actuating devices for reciprocating the carriage and connections between the actuating devices and the movable part of the bottle-holder, whereby when a bottle is inserted the carriage is automatically moved, substantially as described.

5. In a bottle-washing machine, the combination with the main frame and the bottle-holder having a movable member, of a movable carriage, a brush carrying spindle thereon, and actuating devices for reciprocating the carriage, and connections between said devices and the movable member of the bottle-holder for causing the movement of the carriage when a bottle is inserted, substantially as described.

6. In a bottle-washing machine, the combination with the frame, a movable carriage and a rotary spindle thereon carrying a brush, and actuating devices for reciprocating the carriage, of the movable sleeve for cooperating with the mouth of the bottle, the lever cooperating with the sleeve and the rod connected thereto for engaging the carriage-reciprocating devices, substantially as described.

7. In a bottle-washing machine, the combination with the frame, the movable carriage, and the rotary brush-carrying-spindle thereon, the reversely threaded screw, and the switch on the carriage engaging it, of the bottle-holder embodying the movable sleeve, the lever, and the rod connected to the switch for turning it, substantially as described.

8. The combination with the reciprocating carriage, the spindle thereon having the pulley, and the clutch section connected to the latter, of the rotary shaft and the clutch section splined thereto and longitudinally movable thereon, substantially as described.

9. The combination with the reciprocating carriage, the spindle thereon having the pulley, the clutch section connected to the latter, of the rotary shaft, the clutch section splined thereto, and the stop for limiting the movement of the said section in one direction, substantially as described.

10. The combination with the main frame, the rotary shaft, the clutch section splined thereon, and the reversely threaded screw, of the reciprocating carriage and the rotary spindle thereon, the clutch section cooperating with the one on the shaft and connected with the spindle, and the switch cooperating with the screw, substantially as described.

11. The combination with the reversely threaded screw, and the collar at one end thereof having the inclined face, the concentric groove at the other end of the screw, of the reciprocating carriage, the rotary spindle thereon, the switch plate and the pintle in the carriage, and the spring engaging the switch and holding it in adjusted position, substantially as described.

12. The combination with the reversely threaded screw, and the collar thereon, of the reciprocating carriage, and the rotary brush spindle thereon, the switch cooperating with the screw, the spring for holding it, the bottle-holder having the movable member, the rod having the projection beneath the switch, and the lever connected to the rod and operated by the bottle-holder, substantially as described.

HENRY LA CASSE.

Witnesses:
ALFRED NUTTING,
H. MITCHELL.